(12) United States Patent
Rosen et al.

(10) Patent No.: US 9,396,166 B2
(45) Date of Patent: *Jul. 19, 2016

(54) SYSTEM AND METHOD FOR STRUCTURING SPEECH RECOGNIZED TEXT INTO A PRE-SELECTED DOCUMENT FORMAT

(71) Applicant: Nuance Communications, Inc., Burlington, MA (US)

(72) Inventors: Lee Rosen, Milford, CT (US); Ed Roe, Plant City, FL (US); Wade Poust, Hickory, NC (US)

(73) Assignee: Nuance Communications, Inc., Burlington, MA (US)

( * ) Notice: Subject to any disclaimer, the term of this patent is extended or adjusted under 35 U.S.C. 154(b) by 551 days.

This patent is subject to a terminal disclaimer.

(21) Appl. No.: 13/718,568

(22) Filed: Dec. 18, 2012

(65) Prior Publication Data

US 2013/0111331 A1    May 2, 2013

Related U.S. Application Data

(63) Continuation of application No. 13/101,688, filed on May 5, 2011, now Pat. No. 8,356,243, which is a continuation of application No. 10/375,045, filed on Feb. 28, 2003, now Pat. No. 7,958,443.

(51) Int. Cl.
*G06F 17/21* (2006.01)
*G10L 15/26* (2006.01)
*G06F 17/24* (2006.01)

(52) U.S. Cl.
CPC .......... *G06F 17/211* (2013.01); *G06F 17/243* (2013.01); *G10L 15/26* (2013.01); *G06F 17/248* (2013.01)

(58) Field of Classification Search
CPC ..... G06F 17/211; G06F 17/21; G06F 17/243; G06F 17/248
USPC .................................................. 715/221–226
See application file for complete search history.

(56) References Cited

U.S. PATENT DOCUMENTS

| | | | |
|---|---|---|---|
| 4,477,698 A | 10/1984 | Szlam et al. | |
| 4,965,763 A | 10/1990 | Zamora | |

(Continued)

FOREIGN PATENT DOCUMENTS

| | | |
|---|---|---|
| EP | 0 584 454 A1 | 3/1994 |
| JP | 06-083807 | 3/1994 |

(Continued)

OTHER PUBLICATIONS

Japanese Office Action from Japanese Application No. JP 2006-540706 dated Jul. 8, 2010.

(Continued)

*Primary Examiner* — Samuel G Neway
(74) *Attorney, Agent, or Firm* — Wolf, Greenfield & Sacks, P.C.

(57) ABSTRACT

A system for creating a structured report using a template having at least one predetermined heading and formatting data associated with each heading. The steps include recording a voice file, creating a speech recognized text file corresponding to the voice file, identifying the location of each heading in the text file, and the text corresponding thereto, populating the template with the identified text corresponding to each heading, and formatting the populated template to create the structured report.

21 Claims, 1 Drawing Sheet

(56) References Cited

U.S. PATENT DOCUMENTS

| | | | |
|---|---|---|---|
| 5,111,398 A | 5/1992 | Nunberg et al. | |
| 5,253,164 A | 10/1993 | Holloway et al. | |
| 5,325,293 A | 6/1994 | Dorne | |
| 5,327,341 A | 7/1994 | Whalen et al. | |
| 5,392,209 A | 2/1995 | Eason et al. | |
| 5,544,360 A | 8/1996 | Lewak et al. | |
| 5,664,109 A | 9/1997 | Johnson et al. | |
| 5,675,788 A | 10/1997 | Husick et al. | |
| 5,689,585 A | 11/1997 | Bloomberg et al. | |
| 5,799,268 A | 8/1998 | Boguraev | |
| 5,809,318 A | 9/1998 | Rivette et al. | |
| 5,809,476 A | 9/1998 | Ryan | |
| 5,832,450 A | 11/1998 | Myers et al. | |
| 5,875,429 A | 2/1999 | Douglas | |
| 5,883,986 A | 3/1999 | Kopec et al. | |
| 5,915,254 A | 6/1999 | Nakayama et al. | |
| 5,924,068 A * | 7/1999 | Richard et al. | 704/260 |
| 5,950,214 A | 9/1999 | Rivette et al. | |
| 5,970,463 A | 10/1999 | Cave et al. | |
| 5,974,412 A | 10/1999 | Hazlehurst et al. | |
| 5,991,780 A | 11/1999 | Rivette et al. | |
| 6,006,221 A | 12/1999 | Liddy et al. | |
| 6,014,663 A | 1/2000 | Rivette et al. | |
| 6,021,202 A | 2/2000 | Anderson et al. | |
| 6,052,657 A | 4/2000 | Yamron et al. | |
| 6,052,693 A | 4/2000 | Smith et al. | |
| 6,055,494 A | 4/2000 | Friedman | |
| 6,088,437 A | 7/2000 | Amick | |
| 6,100,882 A | 8/2000 | Sharman et al. | |
| 6,108,629 A * | 8/2000 | Kasday | 704/258 |
| 6,182,029 B1 | 1/2001 | Friedman | |
| 6,192,112 B1 | 2/2001 | Rapaport et al. | |
| 6,199,079 B1 | 3/2001 | Gupta et al. | |
| 6,279,017 B1 | 8/2001 | Walker | |
| 6,289,353 B1 | 9/2001 | Hazlehurst et al. | |
| 6,292,771 B1 | 9/2001 | Haug et al. | |
| 6,347,329 B1 | 2/2002 | Evans | |
| 6,360,215 B1 | 3/2002 | Judd et al. | |
| 6,405,165 B1 | 6/2002 | Blum et al. | |
| 6,434,547 B1 | 8/2002 | Mishelevich et al. | |
| 6,438,533 B1 | 8/2002 | Spackman et al. | |
| 6,499,041 B1 | 12/2002 | Breslau et al. | |
| 6,529,902 B1 | 3/2003 | Kanevsky et al. | |
| 6,553,385 B2 | 4/2003 | Johnson et al. | |
| 6,556,987 B1 | 4/2003 | Brown et al. | |
| 6,684,188 B1 | 1/2004 | Mitchell et al. | |
| 6,789,060 B1 * | 9/2004 | Wolfe et al. | 704/235 |
| 6,865,258 B1 * | 3/2005 | Polcyn | 379/88.01 |
| 6,915,254 B1 * | 7/2005 | Heinze et al. | 704/9 |
| 6,947,936 B1 | 9/2005 | Suermondt et al. | |
| 7,124,144 B2 | 10/2006 | Christianson et al. | |
| 7,171,615 B2 | 1/2007 | Jensen et al. | |
| 7,206,998 B2 | 4/2007 | Pennell et al. | |
| 7,233,938 B2 | 6/2007 | Carus et al. | |
| 7,278,094 B1 | 10/2007 | Dreyer et al. | |
| 7,315,811 B2 | 1/2008 | Cote et al. | |
| 7,379,946 B2 | 5/2008 | Carus et al. | |
| 7,542,909 B2 | 6/2009 | Cote | |
| 7,774,196 B2 | 8/2010 | Cote et al. | |
| 7,783,474 B2 | 8/2010 | Cote et al. | |
| 7,822,598 B2 | 10/2010 | Carus et al. | |
| 7,860,717 B2 | 12/2010 | Urhbach et al. | |
| 7,958,443 B2 * | 6/2011 | Rosen et al. | 715/224 |
| 7,996,223 B2 | 8/2011 | Frankel et al. | |
| 8,024,176 B2 | 9/2011 | Carus et al. | |
| 8,069,411 B2 | 11/2011 | Titemore et al. | |
| 8,095,544 B2 | 1/2012 | Boone et al. | |
| 8,200,487 B2 | 6/2012 | Peters et al. | |
| 8,290,958 B2 | 10/2012 | Boone et al. | |
| 8,332,221 B2 | 12/2012 | Peters et al. | |
| 8,356,243 B2 * | 1/2013 | Rosen et al. | 715/224 |
| 8,504,369 B1 | 8/2013 | Chigier et al. | |
| 8,688,448 B2 | 4/2014 | Peters et al. | |
| 2002/0002459 A1 | 1/2002 | Lewis et al. | |
| 2002/0007285 A1 | 1/2002 | Rappaport | |
| 2002/0091713 A1 | 7/2002 | Walker | |
| 2002/0095313 A1 | 7/2002 | Haq | |
| 2002/0099717 A1 | 7/2002 | Bennett | |
| 2002/0103826 A1 | 8/2002 | Kriho et al. | |
| 2002/0143818 A1 | 10/2002 | Roberts et al. | |
| 2002/0143824 A1 | 10/2002 | Lee et al. | |
| 2002/0169764 A1 | 11/2002 | Kincaid et al. | |
| 2002/0188452 A1 | 12/2002 | Howes | |
| 2003/0018668 A1 | 1/2003 | Britton et al. | |
| 2003/0046264 A1 | 3/2003 | Kauffman | |
| 2003/0061201 A1 | 3/2003 | Grefenstette et al. | |
| 2003/0109936 A1 | 6/2003 | Umen et al. | |
| 2003/0115080 A1 | 6/2003 | Kasravi et al. | |
| 2003/0145282 A1 | 7/2003 | Thomas et al. | |
| 2003/0154080 A1 | 8/2003 | Godsey et al. | |
| 2003/0208382 A1 | 11/2003 | Westfall | |
| 2003/0233344 A1 | 12/2003 | Kuno et al. | |
| 2003/0233345 A1 | 12/2003 | Perisic et al. | |
| 2004/0103075 A1 | 5/2004 | Kim et al. | |
| 2004/0111265 A1 * | 6/2004 | Forbes | 704/260 |
| 2004/0139400 A1 | 7/2004 | Allam et al. | |
| 2004/0172245 A1 * | 9/2004 | Rosen et al. | 704/235 |
| 2004/0186746 A1 | 9/2004 | Angst et al. | |
| 2004/0220895 A1 | 11/2004 | Carus et al. | |
| 2004/0243545 A1 * | 12/2004 | Boone et al. | 707/2 |
| 2004/0243551 A1 | 12/2004 | Boone et al. | |
| 2004/0243552 A1 | 12/2004 | Titemore et al. | |
| 2004/0243614 A1 | 12/2004 | Boone et al. | |
| 2004/0255239 A1 | 12/2004 | Bhatt et al. | |
| 2005/0039033 A1 | 2/2005 | Meyers et al. | |
| 2005/0108010 A1 | 5/2005 | Frankel et al. | |
| 2005/0114122 A1 | 5/2005 | Uhrbach et al. | |
| 2005/0120020 A1 | 6/2005 | Carus et al. | |
| 2005/0120300 A1 | 6/2005 | Schwager et al. | |
| 2005/0144184 A1 | 6/2005 | Carus et al. | |
| 2005/0165598 A1 | 7/2005 | Cote et al. | |
| 2005/0165602 A1 | 7/2005 | Cote et al. | |
| 2005/0183006 A1 | 8/2005 | Rivers-Moore et al. | |
| 2005/0192792 A1 | 9/2005 | Carus et al. | |
| 2005/0192793 A1 | 9/2005 | Cote et al. | |
| 2005/0198563 A1 | 9/2005 | Kristjansson | |
| 2005/0207541 A1 | 9/2005 | Cote | |
| 2005/0228815 A1 | 10/2005 | Carus et al. | |
| 2006/0075337 A1 | 4/2006 | Jones et al. | |
| 2011/0231753 A1 | 9/2011 | Rosen et al. | |
| 2012/0095751 A1 * | 4/2012 | Peters et al. | 704/9 |
| 2013/0066625 A1 | 3/2013 | Peters et al. | |
| 2013/0111331 A1 * | 5/2013 | Rosen et al. | 715/246 |
| 2014/0236580 A1 | 8/2014 | Peters et al. | |

FOREIGN PATENT DOCUMENTS

| | | |
|---|---|---|
| JP | 2000-200273 | 7/2000 |
| JP | 2000-235574 A | 8/2000 |
| JP | 2003-196296 A | 7/2003 |
| WO | WO 95/30201 A1 | 11/1995 |

OTHER PUBLICATIONS

Grefenstette et al., What is a Word, What is a sentence? Problems of Tokenization, 3$^{rd}$ Conference on Computational Lexicography and Text Research. Complex '94, Budapest, Jul. 7-10, 1994.

Hirschman, The Roles of Language Processing in a Spoken Language Interface, Voice Communication Between Humans and Machines, National Academy of Sciences, 1994, pp. 217-237; http://www.pnas.org/cgi/reprint/92/22/9970.

Kupiec, Probabilistic Models of Short and Long Distance Word Dependencies in Running Text, Proceedings of DARPA Speech and Natural Language Workshop, 1992, pp. 290-295; http://acl.ldc.upenn.edu/H/H89/H89-1054.pdf.

Maltese et al., An Automatic Technique to Include Grammatical and Morphological Information in a Trigram-Based Statistical Language Model, IEEE International Conference on Acoustics, Speech, and Signal Processing, 1992, pp. 157-160.

Mikheev, Tagging Sentence Boundaries. In NACL '2000 (Seattle), ACL Apr. 2000: 264-271.

(56) References Cited

OTHER PUBLICATIONS

Moore, Integration of Speech with Natural Language Processing, Voice Communication Between Humans and Machines, National Academy of Sciences, 1994, pp. 254-271; http://www.pnas.org/cgi/reprint/92/22/9983.
Murveit et al., Integrating Natural Language Constraints into HMM-Based Speech Recognition, IEEE, 1990, pp. 573-576.
Norton et al., Recent Improvements and Benchmark Results for the Paramax ATIS System, Proceedings of DARPA Workshop on Speech and Natural Language, 1992; http://acl.ldc.upenn.edu/H/H92/H92-1017.pdf.
Ostendorf et al., Integration of Diverse Recognition Methodologies through Reevaluation of N-Best Sentence Hypotheses, Proceedings of DARPA and Natural Language Workshop, 1991; http://acl.ldc.upenn.edu/H/H91/H91-1013.pdf.
Palmer et al., Adaptive Multilingual Sentence Boundary Disambiguation, Computational Linguistics 23(2), 1997.
Rayner et al., Combining Knowledge Sources to Reorder N-Best Speech Hypothesis List, Proceedings DARPA Speech and Natural Language Workshop, 1994; http://acl.ldc.upenn.edu/H/H94/H94-1040.pdf.
Reynar et al., A Maximum Entropy Approach to Identifying Sentence Boundaries. In Proceedings of the Fifth Conference on Applied Natural Language Processing, Washington D.C., 1997: 16-19.
Ringger et al., Error Correction via a Post-Processor for Continuous Speech Recognition, In Proc. of ICASSP-96 IEEE-96, 1996.
Schmid, Unsupervised Learning of Period Disambiguation for Tokenisation. Internal Report, IMS, University of Stuttgart, May 2000.
Schwartz et al., On Using Written Language Training Data for Spoken Language Modelling, Proceedings of Human Language Technology Workshop, Morhan Kaufmann Publishers, Inc., 1994, pp. 94-98; http://acl.ldc.upenn.edu/H/H94/H94-1016.pdf.
Sproat et al., Normalization of Non-standard Words, Computer Speech and Language 15(3) 2001: 287-333.
Sproat, Multilingual Text Analysis for Text-to-Speech Synthesis, ECAI Workshop on Extended Finite-State Models of Language, Aug. 1996.
Strzalkowski et al., A Natural Language Correction Model for Continuous Speech Recognition, Proceedings of the Fifth Workshop on Very Large Corpora, pp. 168-177, Aug. 1997; http://acl.ldc.upenn.edu/W/W97/W97-0117.pdf.
Yarowsky, A Comparison of Corpus-based Techniques for Restoring Accents in Spanish and French Text. In Proceedings, $2^{nd}$ Annual Workshop on Very Large Corpora. Kyoto, 1994: 19-32.
Yarowsky, Decision Lists for Lexical Ambiguity Resolution: Application to Accent Restoration in Spanish and French. In Proceedings of the $32^{nd}$ Annual Meeting of the Association for Computational Linguistics. Las Cruces, NM, 1994: 88-95.
Yarowsky, Homograph Disambiguation in Text-to-Speech Synthesis. In J. van Santen, R. Sproat, J. Olive and J. Hirschberg (eds.), Progress in Speech Synthesis. Springer-Verlag, 1996: 159-175.
Japanese Office Action from Japanese Application No. JP 2013-231893 dated Jul. 22, 2014.
Japanese Office Action from Japanese Application No. JP 2006-540706 dated Jan. 11, 2011.
Japanese Office Action from Japanese Application No. JP 2011-103843 mailed Dec. 4, 2012.
Japanese Office Action from Japanese Application No. JP 2011-103843 dated Jul. 9, 2013.
Japanese Office Action from Japanese Application No. JP 2011-170125 mailed Dec. 18, 2012.
Japanese Office Action from Japanese Application No. JP 2011-170125 dated Jul. 9, 2013.
International Search Report and Written Opinion for PCT/IB2004/052405 mailed Feb. 3, 2006.
International Preliminary Report on Patentability for PCT/IB2004/052405 mailed Jul. 20, 2006.
Canadian Office Action from Canadian Application No. 2614233 dated Mar. 12, 2010.
Extended European Search Report from European Application No. 06786051.0, dated Jul. 8, 2010.
International Search Report and Written Opinion for PCT/US2006/025718 mailed Oct. 23, 2007.
International Preliminary Report on Patentability for PCT/US2006/025718 mailed May 24, 2011.
Canadian Office Action from Canadian Application No. 2523997 dated Aug. 4, 2010.
Extended European Search Report from European Application EP 04753663.6, dated Jan. 4, 2008.
Examination Report from European Application EP 04753663.6, dated Jul. 20, 2010.
Examination Report from European Application EP 04753663.6 dated Jun. 17, 2011.
Extended European Search Report from European Application EP 12177400.4, dated Jan. 4, 2013.
Extended European Search Report from European Application EP 12177400.4, dated Mar. 7, 2013.
International Search Report and Written Opinion for PCT/US2004/016878 mailed Mar. 9, 2005.
International Preliminary Report on Patentability for PCT/US2004/016878 mailed Dec. 15, 2005.
[No Author Listed] Case Study: Massachusetts Medical Society http://www.microsoft.com/resources/casestudies/CaseStudy.asp?CaseStudyID=14931 posted Jan. 13, 2004.
[No Author Listed] Category III CPT Codes, American Medical Association, http://www.ama-assn.org/ama/pub/article/3885-4897.html printed Mar. 22, 2004.
[No Author Listed] Code Information and Education web page, American Medical Association, http://www.ama-assn.org/ama/pub/category/3884.html ptinted Mar. 22, 2004.
[No Author Listed] Continuity of Care Record (CCR), AAFP Center for Health Information Technology, http://www.centerforhit.orq/x201.xml posted Aug. 20, 2004.
[No Author Listed] Continuity of Care Record (CCR): The Concept Paper of the CCR, v. 2.1b, http://www.bhtinfo.com/CCR.Concept%20Paper.1.5.doc.
[No Author Listed] Continuity of Care Record, American Academy of Family Physicians, http://www.aafp.org/x24962.xml?printxml posted Nov. 12, 2003.
[No Author Listed] Core Measures web page, Joint Commission on Accreditation of Healthcare Organizations, http://www.jcaho.org/pms/core+measures/ printed Mar. 22, 2004.
[No Author Listed] Customizing D/41 Call Analysis, date unknown, Intel Corp., Santa Clara, California, available at http://resource.intel.com/telecom/support/appnotes/custd41d.htm (last accessed Jul. 25, 2005).
[No Author Listed] Epic Web Training Manual, pp. 1-33, 2002.
[No Author Listed] Hardware Reference Manual, Release 3 for DOS, revised Jan. 1994, P1KA Technologies, Inc., Ontario, Canada, available at http://www.pikatechnolopies.com/downloads/Ieoacy/AVA%20BSeries%20Hardware%20Manual.pdf (last accessed Jul. 25, 2005).
[No Author Listed] ICD-9-CM Official Guidelines for Coding and Reporting, effective Oct. 1, 2003.
[No Author Listed] ICD-9-CM Preface (FY04), http://ftp.cdc.dov/pub/HealthStatistics/NCHS/Publications/ICD9-CM/2004/Prefac05.RTF.
[No Author Listed] Press Release: Kryptiq Announces Support of CCR Initiative and Introduces New Solutions that Enable Information Portability, Accessibility and Clinical System Interoperability, http://www.kryptiq.com/News/PressReleases/27.html posted Feb. 17, 2004.
[No Author Listed] Specifications Manual for National Implementation of Hospital Core Measures, v. 2.0, Joint Commission on Accreditation of Healthcare Organizations, http://www.jcaho.orq/pms/core+measures/information+on+final+specifications.htm.
[No Author Listed] Stemming Errors. http://www.comp.lancs.ac.uk/computing/research/stemming/general/stemmingerrors.htm printed Jul. 19, 2004.
[No Author Listed] Stemming Peformance. http://www.comp.lancs.ac.uk/computing/research/stemming/general/performance.htm printed Jul. 19, 2004.

(56) References Cited

OTHER PUBLICATIONS

[No Author Listed] What is Stemming? http://www.comp.lancs.ac.uk/comnuting/researchistemming/general/index.htm printed Jul. 19, 2004.
[No Author Listed] Work Item Summary: WK4363 Standard Specification for the Continuity of Care Record (CCR), http://www.astm.org/cgi-bin/SoftCart.exe/DATABASE.CART/WORKITEMS/WK4363.htm?E+mystore Mar. 3, 2004.
Braithwaite, Continuity of Care Record (CCR) http://www.h17.org/library/himss/2004Orlando/ContinuityofCareRecord,pdf.
Brill, Some Advances in Transformation-Based Part of Speech Tagging, Spoken Language Systems Group. MIT.
Creutz, Morphology and Finite-State Transducers, Oct. 31, 2001, Chap 3, Jurafsky & Martin.
Cutting et al., A Practical Part-of-Speech Tagger, Xerox Palo Alto Research Center.
Daelemans et al., TIMBL: Tilburg Memory Based Learner, version 5.0, Reference Guide, ILK Research Group Technical Report Series No. 04-02 (ILK-0402), ILK Research Group, Tilburg University, Tilburg, Netherlands, 2004.
Day, Extracting Knowledge from Text Using Learning by Constraint Relaxation (LCR), CSI, www.csi-inc.com/CSI/pdf/iday icim02.pdf.
Gale et al., Discrimination Decisions for 100,000-Dimensional Spaces, Current Issues in Computational Linguistics, pp. 429-450, Kluwer Academic Publishers, 1994.
Hearst, Multi-paragraph segmentation of expository text. Annual Meeting of the Association for Computational Linguistics. Proceedings of the Conference. Arlington, VA. Jun. 26, 1994:9-16.
Heinonen, Optimal Multi-Paragraph Text Segmentation by Dynamic Programming. Proceedings of the International Conference on Computational Linguistics. 1998;P98:1484-86.
Hieb, Research Note, NLP Basics for Healthcare, Aug. 16, 2002.
Lee et al., Cleansing Data for Mining and Warehousing, Lecture Notes in Computer Science vol. 1677 archive, Proceedings of the le International Conference on Database and Expert Systems Applications, pp. 751-760, Springer-Verlag, London, 1999.
McGregor et al. "The e-baby data warehouse: a case study" System Sciences, 2001. HICSS. Proceedings of the 35th Annual Hawaii International Conference on Jan. 7-10, 2001, Piscataway, NJ, USA, IEEE, Los Alamitos CA, pp. 2871-2877, 2001.
McLaughlin, Java & XML. Second Edition, Japan, O'Reilly, May 25, 2002, IBBN: 4-87311-082-3, xv, p. 10.
Nevill-Manning et al., The Development of Holte's 1R Classifier, Department of Computer Science. University of Waikato, New Zealand.
Nivre, DAC723: Language Technology Finite State Morphology, Vaxjo University of Mathematics and Systems Engineering, p. 1/11.
Ponte et al., Text segmentation by topic. Research and Advanced Technology for Digital Libraries. European Conference, ECDL Proceedings. Sep. 1, 1997:113-125.
Shalizi et al., Pattern Discovery in Time Series, Part I: Theory, Algorithm, Analysis, and Convergence, Journal of Machine Learning Research (2002) Submitted Oct. 28, 2002; Published 2002.
Smith et al., "MICROARRAS: An Advanced Full-Text Retrieval and Analysis System," Proceedings of the Tenth Annual International ACMSIGIR Conference on Research & Development in Information Retrieval, ACM 1987, pp. 187-195.
Song et al., A Cognitive Model for the Implementation of Medical Problem Lists, Proceedings of the First Congress on Computational Medicine, Public Health and Biotechnology, Austin, Texas, 1994.
Song et al., A Graphical Interface to a Semantic Medical Information System, Journal of Foundations of Computing and Decision Sciences, 22(2), 1997.
Song et al., A Graphical Interface to a Semantic Medical Information System, Karp-95 Proceedings of the Second International Symposium on Knowledge Acquisition, Representation and Processing, pp. 107-109, 1995.
Van Mulbregt et al., Text segmentation with multiple surface linguistic cues. Proceedings of the 36th Annual Meeting on Association for Computational Linguistics. Montreal, Quebec. 1998;2:881-85.
Van Rijsbergen, Search Strategies. Information Retrieval, 2nd Ed., Ch. 5, Butterworths, London, 1979.
Waegemann, EHR vs. CCR: What is the difference between the electronic health record and the continuity of care record?, Medical Records Institute, 2004.
Yagi, Reiko, "Looming Next MS Office, Featuring Information Sharing with XML," Nikkei BYTE, No. 240, Japan, Nikkei BP, pp. 14-15, Apr. 22, 2003.
Yagi, Reiko, "Way to Survive for Package Software," Nikkei BYTE, No. 238, Japan, Nikkei BP, pp. 84-85, Feb. 22, 2003.
Yang et al., "Faster algorithm of string comparison," Pattern Analysis and Applications, vol. 6, No. 1, Apr. 2003: pp. 122-133.
Zavrel et al., Recent Advances in Memory-Based Part-of-Speech Tagging, ILK/Computational Linguistics. Tilburg University, The Netherlands.
Japanese Office Action from Japanese Application No. JP 2013-231893 dated Dec. 16, 2014.
Narita et al., Automatic SGML Tagging for Full-text Database of Technical Papers, Proceedings of 1$^{st}$ Annual Meeting of the Association of Natural Language Processing, Mar. 31, 1995, 329-32, Japan, http://www.anlp.jp/proceedings/annual_meeting/1995/index.html [last accessed on Dec. 9, 2014].

* cited by examiner

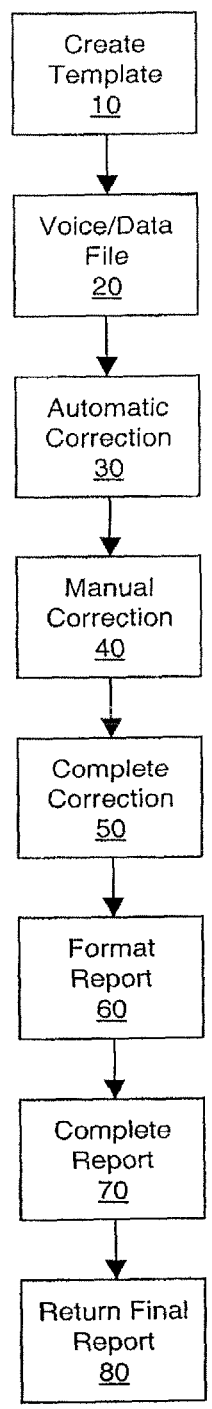

SYSTEM AND METHOD FOR STRUCTURING SPEECH RECOGNIZED TEXT INTO A PRE-SELECTED DOCUMENT FORMAT

RELATED APPLICATIONS

This application is a continuation of and claims priority from U.S. patent application Ser. No. 13/101,688, entitled "SYSTEM AND METHOD FOR STRUCTURING SPEECH RECOGNIZED TEXT INTO A PRE-SELECTED DOCUMENT FORMAT" filed on May 5, 2011 which is a continuation of U.S. application Ser. No. 10/375,045, entitled "SYSTEM AND METHOD FOR STRUCTURING SPEECH RECOGNIZED TEXT INTO A PRE-SELECTED DOCUMENT FORMAT" filed on Feb. 28, 2003, each of which is incorporated herein by reference in its entirety.

BACKGROUND OF INVENTION

The present invention relates generally to structuring, correcting, and formatting speech recognized text.

Today's speech recognition technology enables a computer to transcribe spoken words into computer recognized text equivalents. Speech recognition is the process of converting an acoustic signal, captured by a transductive element, such as a microphone or a telephone, to a set of words. These words can be used for numerous applications including data entry and word processing. The development of speech recognition technology has traditionally focused on accurate speech recognition, which has been a formidable task due to the wide variety of pronunciations, individual accents, and speech characteristics of individual speakers. Today's leading speech recognition software includes features for continuously learning the vocabulary and grammar of specific users.

Even with this improved speech recognition software, a transcriber or correctionist is often still necessary to correct mistakes. Additionally, a transcriber plays an important role in formatting the outputted text into a pre-determined structured format. Formatting speech recognized text into formatted reports is common in many professions that rely on dictation to maximize efficiency, such as is found in the medical professions. Currently, a transcriber will review and correct the unstructured text, create headings, format certain text, and cut and paste different sections of text in order to create the desired report format. This additional formatting work provides longer transcription times and reduced productivity, thereby mitigating the benefits of speech recognition. What is needed is a system for simplifying this process of structuring and formatting speech recognized text.

SUMMARY OF INVENTION

The present invention overcomes the above-discussed shortcomings and satisfies a significant need for providing a speech recognition correction system that automatically creates a structured report. A system in accordance with certain teachings of the present invention will increase productivity by reducing the number of man-hours necessary to correct speech recognized text that is used for generating standard reports. The steps include creating a template having a user-defined format having at least one predetermined heading, selecting a voice file and a corresponding speech recognized text file, identifying the location of each heading in the text file, and the text corresponding thereto, and populating the template with the identified text corresponding to each heading.

The identifying step contains two phases. The automatic correction phase is carried out by computer which automatically locates and marks each heading in the speech recognized text file. The manual correction phase is carried out by a transcriber who locates any unmarked headings in the speech recognized text file and marks each unmarked heading using a hot key corresponding to each heading that is pre-defined in the template. The populated template is then converted into a into a word processing file, which is then formatted either automatically or manually into final report. A template created in accordance with the present disclosure may also contain formatting data that corresponds to each heading and can be automatically applied to each heading and corresponding text section in the word processing file. Such formatting data includes but is not limited to font, font size, bolding, underlining, italics, spacing, and alignment.

The above advantages and features are of representative embodiments only, and are presented only to assist in understanding the invention. It should be understood that they are not to be considered limitations on the invention as defined by the claims, or limitations on equivalents to the claims. Additional features and advantages of the invention will become apparent from the drawings, the following description, and the claims.

BRIEF DESCRIPTION OF DRAWINGS

While the specification concludes with claims particularly pointing out and distinctly claiming the present invention, it is believed the same will be better understood from the following description taken in conjunction with the accompanying drawings, which illustrate, in a non-limiting fashion and the best mode presently contemplated for carrying out the present invention, wherein:

FIG. 1 is a flow diagram depicting a system for formatting speech recognition text in accordance with certain teachings of the present invention.

DETAILED DESCRIPTION OF INVENTION

The present disclosure will now be described more fully with reference to FIG. 1 in which a flow diagram showing a preferred embodiment of the present disclosure is shown. The subject matter of this disclosure may, however, be embodied in many different forms and should not be construed as being limited to the embodiments set forth herein.

Referring to FIG. 1, a flow diagram generally illustrates the steps for formatting unstructured speech recognized text in accordance with certain teachings of the present disclosure. First, as shown in Box 10, a template is created identifying the section headings and the formatting information for a final report. It is intended that such a template can be created by a programmer for a single specific application, or can be created by a template wizard as part of a speech recognition correction software package. The template is designed to store headings that are assigned an indicator, and are preferably associated with a special keystroke, which can ultimately be used to manually mark and identify a heading in a speech recognized text file. When used within a speech recognized text file, each heading indicator can be saved in its particular location within the text file. Hundreds of headings can be associated with a template depending on the requirements for each template. Other formatting characteristics, such as font characteristics (type, size, bolding, italics, underlining, etc.) and alignment, can also be added to the template in order to automatically format the final report format.

Box 20 represents the first step of the correction process in which a voice/data wave file is created. A voice wave file is recorded using traditional methods for dictation recording. While speaking, the dictator should dictate section headings prior to stating the information that belongs in that section of the report. These section headings should correspond with the exact section headings stored in the template created in Box 10. For example, a doctor dictating the family history of a patient would dictate the heading FAMILY HISTORY prior to discussing the family history of a patient (presuming that FAMILY HISTORY is a heading stored in the template). After the voice file is created, speech recognition software is used to create a text file corresponding to the voice wave file. This text file is then packaged within the voice wave file to create a voice/data file, which is then stored and ultimately forwarded to a transcriber for corrections.

Box 30 represents the third step of the process in which the correction software retrieves the voice/data file and unpackages it, sending the voice wave data to the media player, and sending the associated text data to the screen in an editor window. The correction software may be included with the speech recognition software or may be a separate software program. The text file is then parsed and displayed on the transcriber's screen in an editor window. The displayed text data now includes not only the text of the transcribed voice file, but also contains the indicators for each section heading, which is automatically marked by the correction software. Either automatically or by prompt, the correction software may also display the text file separated by the automatically recognized section headings within a separate window on the screen. All of the section headings that are available for the template may also be displayed in another window, accompanied by each section's template-defined hot key. This guide can be used by the transcriber to manually add additional section headings and breaks during the manual correction step as described further in Box 40.

Box 40 represents the fourth step of the process where the transcriber makes manual corrections to the text file while listening to the voice wave file. Such manual corrections include but is not limited to correcting misrecognized or unrecognized words, as well as adding new section heading markers in the body of the text. While the voice file is playing from the media player, an indication is displayed in the text coinciding with the voice playback. While making manual corrections, a hot key (such as a function key, for example), which is associated with each section heading in the template, can be used to manually apply section heading markers within the speech recognized text file. This could normally be necessary if the dictator failed to dictate a section heading, misstated a section heading, or if the section heading was otherwise not recognized by the speech recognition software.

Box 50 represents the fifth step of the process, which is completion of the editing process. Once the document has been corrected and all section headings have been identified either automatically (correction software successfully matched the section heading from the text file with template-defined section headings) or manually (transcriber manually entered a template-defined hot key marker that relating to a section heading), the correction process is over. The correction software will have a COMPLETE CORRECTION or similar prompt that can then be used. The correction software will then output the corrected text file into a word processing format, creating a draft report following the template format. This draft report will list each section in order, with each accompanying text section placed under the correct section heading. Furthermore, depending on the format information contained in the template, font characteristics, spacing, and alignment also be applied to this draft report.

Box 60 represents the final step of the correction process in which the transcriber further formats the draft report in the word processing format, including spell checking and alignment. Once the draft report is fully formatted and corrected, the COMPLETE REPORT or similar prompt may be used to save the final report onto the server (Box 70). Finally, the report may then be returned to the dictator as shown in Box 80.

EXAMPLE

The disclosed subject matter will now be described in relation to an illustrative example. A template created for a hospital in accordance with certain teachings of the present disclosure may have the following stored information, including but not limited to the order of each section in the final report, the name of each section heading, an abbreviation used for each heading to be marked in the text file, and a hotkey assigned to each heading for use during manual correction:

| Location | Name | Abbreviation | Hot Key |
|---|---|---|---|
| 1 | Family History | FH | <F1> |
| 2 | Medical History | SH | <F2> |
| 3 | Impression | IM | <F3> |
| 4 | Discharge Summary | DI | <F4> |

While treating a patient, a doctor would record a voice file, clearly stating the name of each section heading prior to dictating the medical impressions for that section. An unstructured speech recognized text file created from such a recording might appear as follows (where the "blah blah . . . represents the medical impressions dictated by the doctor):

FAMILY HISTORY blah blah blah blah . . .
MEDICAL HISTORY blah blah blah . . .
DISCHARGE INSTRUCTIONS blah blah blah blah . . .
IMPRESSION blah blah . . .

This text file is then packaged with the corresponding voice file and routed to a transcriber. Using a correction software in accordance with certain teachings of the present disclosure, the text file is parsed and each of the heading sections are automatically marked within the text. In this example, note that the doctor mistakenly dictated the heading within the text. In this example, note that the doctor mistakenly dictated the heading DISCHARGE INSTRUCTIONS instead of the template heading DISCHARGE SUMMARY. The transcriber, while making manual corrections, could manually mark DISCHARGE INSTRUCTIONS as a DISCHARGE SUMMARY heading by hitting the <F4> key when the indicator is at the appropriate text.

After manual corrections are complete, the transcriber would hit the COMPLETE CORRECTION prompt, which would generate a draft report in a word processing format. In this draft final report, all section headings and their corresponding text sections would bear all formatting information (font, bolding, alignment, etc.) stored in the template and would appear in the specified template order. In this word processing file, the transcriber then has the ability to spell check the report and correct any other further formatting and alignment issues. A final report for this example, fully formatted, might appear as follows:

```
A. FAMILY HISTORY
   blah blah blah blah . . .
B. MEDICAL HISTORY
   blah blah blah . . .
C. IMPRESSION
   blah blah . . .
D. DISCHARGE INSTRUCTIONS
   blah blah blah blah . . .
```

It will be apparent to one of skill in the art that described herein is a novel system for automatically structuring and formatting speech recognized text. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A system comprising at least one processor programmed to:
   identify, within an input text, a plurality of portions of text, each portion of text corresponding to a section type from a plurality of section types specified in a report template, wherein the report template specifies the plurality of section types at least in part by storing a plurality of section headings corresponding respectively to the plurality of section types;
   insert a plurality of indicators into the input text, each indicator corresponding to a respective portion of text in the plurality of portions of text and marking a location in the input text where the respective portion of text begins;
   display, to a user, at a first portion of a screen, the input text with the plurality of indicators inserted therein;
   display, to the user, at a second portion of the screen that is different from the first portion of the screen, at least some of the plurality of section headings stored in the report template, wherein the at least some of the plurality of section headings and at least some of the input text with the inserted indicators are visible simultaneously;
   receive input from the user indicating the user wishes to mark a location in the input text as a beginning of a section, the input identifying a section heading from the at least some of the plurality of section headings displayed to the user;
   insert an indicator at the location indicated by the input, wherein the indicator corresponds to the section heading identified by the input;
   for at least one portion of text in the plurality of portions of text, identify formatting data based at least in part on the section type of the at least one portion of text; and
   use the input text with the plurality of indicators inserted therein to generate a structured report comprising the plurality of portions of text, wherein the at least one portion of text is formatted according to the formatting data identified based at least in part on the section type of the at least one portion of text.

2. The system of claim 1, wherein the formatting data comprises at least one format selected from a group consisting of: font type, font size, bolding, underlining, italicizing, spacing and alignment.

3. The system of claim 1, wherein the formatting data is stored in the report template in association with the section type of the at least one portion of text, and wherein the at least one processor is programmed to identify the formatting data at least in part by using the section type of the at least one portion of text to access the formatting data from the report template.

4. The system of claim 1, wherein the at least one processor is programmed to:
   in generating the structured report, place the at least one portion of text under the section heading corresponding to the section type of the at least one portion of text.

5. The system of claim 1, wherein the report template stores a plurality of hot keys corresponding respectively to the plurality of section headings.

6. The system of claim 5, wherein the input indicates that the user has activated a hot key corresponding to the section heading.

7. The system of claim 6, wherein the at least one processor is further programmed to:
   display, to the user, hot keys corresponding respectively to the at least some of the plurality of section headings, wherein the hot keys are displayed in a manner that associates each hot key with the corresponding section heading.

8. A method performed by at least one processor, the method comprising acts of:
   identifying, within an input text, a plurality of portions of text, each portion of text corresponding to a section type from a plurality of section types specified in a report template, wherein the report template specifies the plurality of section types at least in part by storing a plurality of section headings corresponding respectively to the plurality of section types;
   inserting a plurality of indicators into the input text, each indicator corresponding to a respective portion of text in the plurality of portions of text and marking a location in the input text where the respective portion of text begins;
   displaying, to a user, at a first portion of a screen, the input text with the plurality of indicators inserted therein;
   displaying, to the user, at a second portion of the screen that is different from the first portion of the screen, at least some of the plurality of section headings stored in the report template, wherein the at least some of the plurality of section headings and at least some of the input text with the inserted indicators are visible simultaneously;
   receiving input from the user indicating the user wishes to mark a location in the input text as a beginning of a section, the input identifying a section heading from the at least some of the plurality of section headings displayed to the user;
   inserting an indicator at the location indicated by the input, wherein the indicator corresponds to the section heading identified by the input;
   for at least one portion of text in the plurality of portions of text, identifying formatting data based at least in part on the section type of the at least one portion of text; and
   using the input text with the plurality of indicators inserted therein to generate a structured report comprising the plurality of portions of text, wherein the at least one portion of text is formatted according to the formatting data identified based at least in part on the section type of the at least one portion of text.

9. The method of claim 8, wherein the formatting data comprises at least one format selected from a group consisting of: font type, font size, bolding, underlining, italicizing, spacing and alignment.

10. The method of claim 8, wherein the formatting data is stored in the report template in association with the section type of the at least one portion of text, and wherein the act of identifying the formatting data comprises using the section type of the at least one portion of text to access the formatting data from the report template.

11. The method of claim 8, comprising:
    in generating the structured report, placing the at least one portion of text under the section heading corresponding to the section type of the at least one portion of text.

12. The method of claim 8, wherein the report template stores a plurality of hot keys corresponding respectively to the plurality of section headings.

13. The method of claim 12, wherein the input indicates that the user has activated a hot key corresponding to the section heading.

14. The method of claim 13, further comprising:
    displaying, to the user, hot keys corresponding respectively to the at least some of the plurality of section headings, wherein the hot keys are displayed in a manner that associates each hot key with the corresponding section heading.

15. At least one non-transitory computer storage having encoded thereon instructions that, when executed by at least one processor, perform a method comprising acts of:
    identifying, within an input text, a plurality of portions of text, each portion of text corresponding to a section type from a plurality of section types specified in a report template, wherein the report template specifies the plurality of section types at least in part by storing a plurality of section headings corresponding respectively to the plurality of section types;
    inserting a plurality of indicators into the input text, each indicator corresponding to a respective portion of text in the plurality of portions of text and marking a location in the input text where the respective portion of text begins;
    displaying, to a user, at a first portion of a screen, the input text with the plurality of indicators inserted therein;
    displaying, to the user, at a second portion of the screen that is different from the first portion of the screen, at least some of the plurality of section headings stored in the report template, wherein the at least some of the plurality of section headings and at least some of the input text with the inserted indicators are visible simultaneously;
    receiving input from the user indicating the user wishes to mark a location in the input text as a beginning of a section, the input identifying a section heading from the at least some of the plurality of section headings displayed to the user;
    inserting an indicator at the location indicated by the input, wherein the indicator corresponds to the section heading identified by the input;
    for at least one portion of text in the plurality of portions of text, identifying formatting data based at least in part on the section type of the at least one portion of text; and
    using the input text with the plurality of indicators inserted therein to generate a structured report comprising the plurality of portions of text, wherein the at least one portion of text is formatted according to the formatting data identified based at least in part on the section type of the at least one portion of text.

16. The at least one non-transitory computer storage of claim 15, wherein the formatting data comprises at least one format selected from a group consisting of: font type, font size, bolding, underlining, italicizing, spacing and alignment.

17. The at least one non-transitory computer storage of claim 15, wherein the formatting data is stored in the report template in association with the section type of the at least one portion of text, and wherein the act of identifying the formatting data comprises using the section type of the at least one portion of text to access the formatting data from the report template.

18. The at least one non-transitory computer storage of claim 15, wherein the method comprises:
    in generating the structured report, placing the at least one portion of text under the section heading corresponding to the section type of the at least one portion of text.

19. The at least one non-transitory computer storage of claim 15, wherein the report template stores a plurality of hot keys corresponding respectively to the plurality of section headings.

20. The at least one non-transitory computer storage of claim 19, wherein the input indicates that the user has activated a hot key corresponding to the section heading.

21. The at least one non-transitory computer storage of claim 20, wherein the method further comprises:
    displaying, to the user, hot keys corresponding respectively to the at least some of the plurality of section headings, wherein the hot keys are displayed in a manner that associates each hot key with the corresponding section heading.

\* \* \* \* \*